No. 612,822. Patented Oct. 25, 1898.
G. J. CAPEWELL.
POWER TRANSMITTING MECHANISM.
(Application filed Mar. 8, 1897. Renewed May 13, 1898.)
(No Model.) 2 Sheets—Sheet 1.
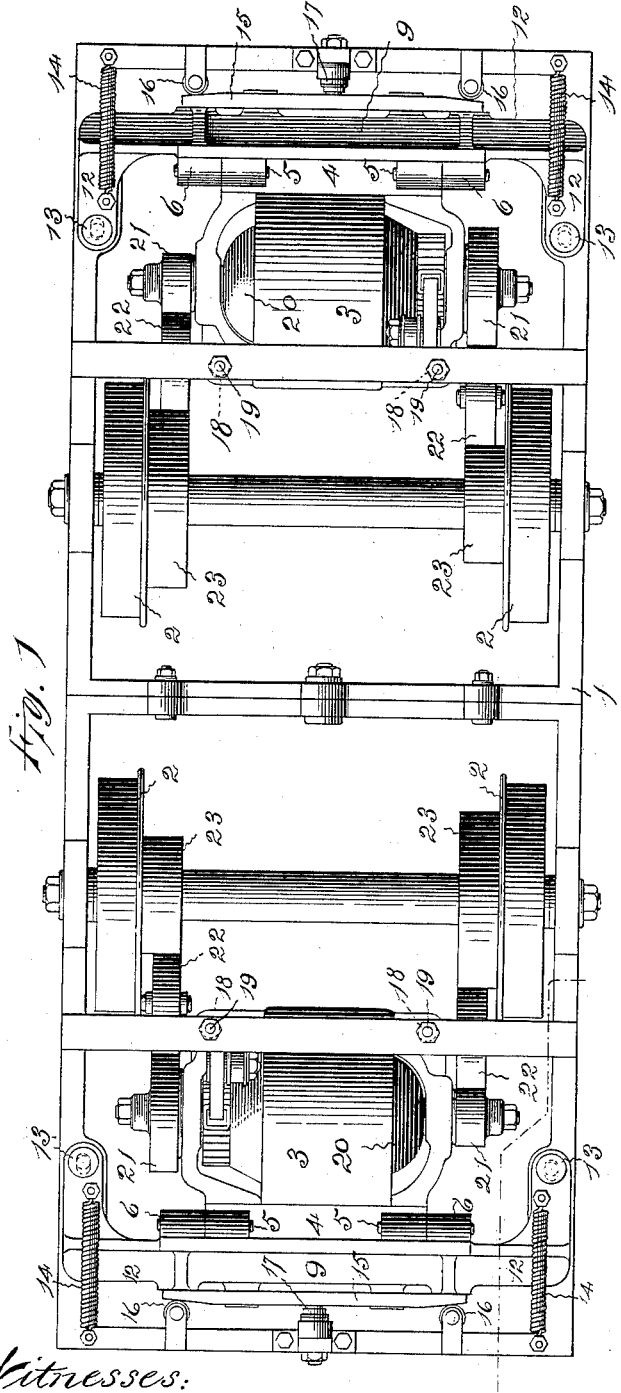
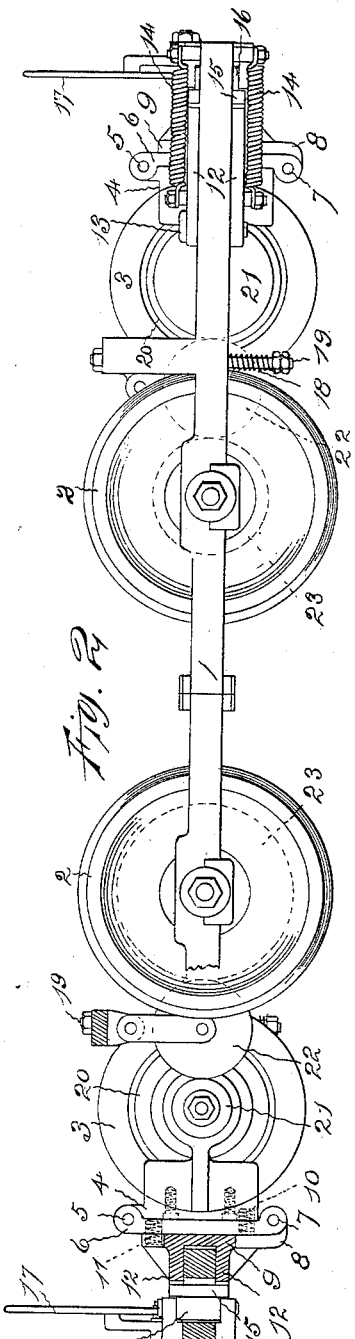
Witnesses:
E. J. Hyde.
E. W. Fothergill.
Inventor:
George J. Capewell,
by Harry R. Williams
atty.

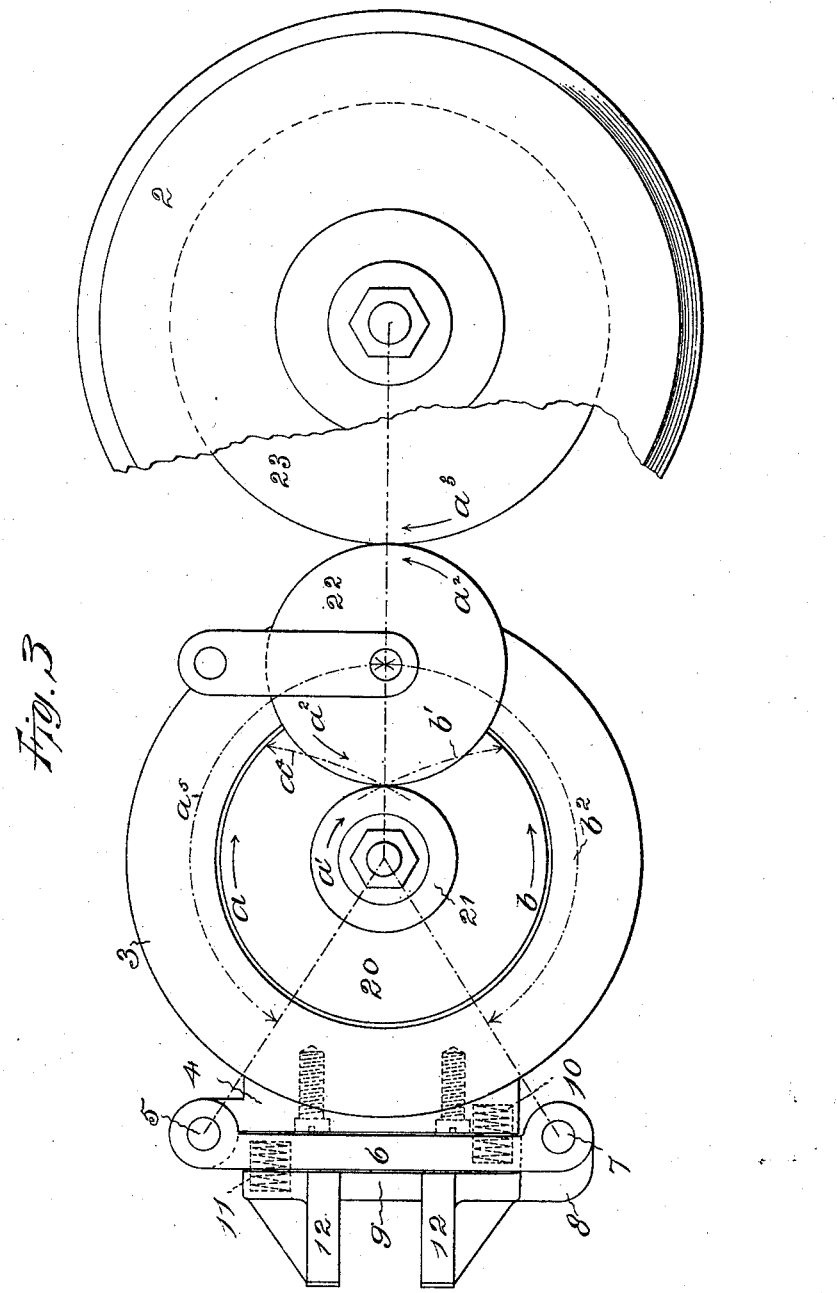

UNITED STATES PATENT OFFICE.

GEORGE J. CAPEWELL, OF HARTFORD, CONNECTICUT.

POWER-TRANSMITTING MECHANISM.

SPECIFICATION forming part of Letters Patent No. 612,822, dated October 25, 1898.

Application filed March 8, 1897. Renewed May 13, 1898. Serial No. 680,647. (No model.)

*To all whom it may concern:*

Be it known that I, GEORGE J. CAPEWELL, a citizen of the United States, residing at Hartford, in the county of Hartford and State of Connecticut, have invented certain new and useful Improvements in Power-Transmitting Mechanisms, of which the following is a specification.

The invention relates to mechanisms which are designed and constructed for transmitting rotary motion by friction from one shaft, wheel, or pulley to another shaft, wheel, or pulley.

The object of the invention is to provide an arrangement of mechanisms which will noiselessly transmit power from a rotary driving part to a rotary driven part with a force proportional to the load on the driven part, whereby when such mechanisms are applied for the propulsion of vehicles or for the driving of machines the frictional grip of the rotary parts will automatically vary and adjust itself to the amount of work necessary to be accomplished, and thus effect a saving of initial energy, reduce wear on the bearings, and eliminate slip and noise.

This invention resides in an arrangement of mechanisms having a shaft, wheel, or pulley to which the power is to be applied and a shaft, wheel, or pulley upon which are brought the strains of the load, these being so located, arranged, and supported with relation to each other that the driving frictional grip between the rotary driving part and the rotary driven part will always be proportional to the load, the rotary parts that are in frictional contact automatically wedging themselves together and increasing the frictional grip as the load becomes heavier and releasing themselves and decreasing the frictional grip as the load becomes lighter, as more particularly hereinafter described, and pointed out in the claims.

This invention, although applicable to the transmission of motion in various kinds of machines, has particular utility in connection with the propulsion of traveling vehicles, such as horseless carriages and electric-railway cars, and therefore it is illustrated in the accompanying views in the form designed for electric-railway cars, and the description in this specification will be confined to this form.

Figure 1 of the views shows a plan of a car-truck provided with electric motors and an embodiment of my invention for transmitting the rotary motions of the armatures to the wheels. Fig. 2 shows a side elevation of the same with parts broken away to better illustrate the construction, and Fig. 3 is a diagram illustrating the arrangement and action of the parts of the power-transmitting mechanisms.

The rectangular truck-frame 1 is supported upon the axles of the traction-wheels 2. Near each end of the truck-frame an electric motor 3 is mounted. These motors are secured to vertically-arranged bases 4, that are hinged by pivots 5 to the upper ends of plates 6, which at their lower ends are hinged by pivots 7 to ears 8, projecting from the motor-beds 9. Spiral springs 10 are located between the motor-bases 4 and the plates 6 in such manner as to tend to separate these parts, and spiral springs 11 are located between the plates 6 and the motor-beds 9 to force these parts from each other. The motor-beds are supported by the truck-frame so that they may be given a little movement toward and from the traction-wheels. In the construction shown the beds have projecting flanges 12, that lie above and below the bars of the truck-frame and that are loosely retained in position by studs 13, that pass from flange to flange through the bars of the frame, the openings for the studs being a little larger than the diameters of the studs to permit the necessary movement.

Spiral springs 14 are connected with the truck-frame and the movable motor-beds in such manner as to tend to draw the latter in directions away from the traction-wheels.

Wedge-bars 15 are provided for forcing the motor-beds toward the traction-wheels. The inclining faces of the wedge-bars that are loosely supported by parts of the truck-frame are engaged by rolls 16, mounted in suitable bearings on the frame, and the opposite faces are in engagement with portions of the motor-beds. When a wedge is moved in one direction by the oscillation of a lever 17, one side of the motor-bed that is engaged by that wedge is forced toward the traction-wheels, while the other side of that bed is drawn away from the traction-wheels. The oscillation of the proper lever in the necessary direction will move the desired side of the motor-bed toward the traction-wheels and the opposite side of the same motor-bed away from the traction-wheels, and of course the motor that is hinged to that bed moves with it.

The motor-frames that are secured to the hinged vertical bases 4 are yieldingly retained in proper horizontal positions and kept from dropping down by springs 18, that are supported by bolts 19, connected with portions of the truck-frame.

The motor-armatures 20 are supported, as usual, by any suitable bearings in ordinary frames attached to the bases. Supported upon the armature-shafts are friction wheels or pulleys 21, and supported by bearings that are attached to the truck-frame, so as to have a little oscillation, are friction wheels or pulleys 22. These latter pulleys are located so as to be just out of frictional contact with the peripheries of the pulleys 21 on the armature-shafts when the wedges are in their neutral positions and the motor-beds are drawn away from the traction-wheels. The pulleys 22 are in engagement with the friction wheels or pulleys 23, mounted on the axles of the traction-wheels.

When a wedge is moved in one direction, one side of a motor-bed is forced toward the traction-wheels in such manner that the pulley on the armature-shaft on that side will engage the pulley held by the swinging bearings on the same side and that is in engagement with a pulley on the axle of the traction-wheels. This movement of the lever that causes the engagement of the pulleys on one side of the motor disengages the pulleys on the other side of the same motor. If the pulleys on the same armature-shaft are of different diameters, different rates of speed may be transmitted to the traction-wheels by the movements of the levers which engage or disengage the different pulleys; but if the pulleys on the same armature-shaft are of the same diameter the mechanisms for moving the opposite sides of the motor-beds will be unnecessary.

Should it be desired to support the motors near the axles of the traction-wheels, the intermediate pulleys—that is, those between the driving-pulleys on the armature-shafts and the driven pulleys on the traction-wheel axles—may be omitted and the driving-pulleys may be engaged directly with the driven pulleys.

The action of the engagement of the power-transmitting pulleys, supported and arranged in this manner, is illustrated in Fig. 3 of the drawings.

If the armature 20 is rotating in the direction indicated by the arrow $a$, the pulley 21 will rotate in the direction indicated by the arrow $a'$ and will cause the pulley 22 to rotate in the direction indicated by the arrow $a^2$, and this will rotate the pulley 23 in the direction indicated by the arrow $a^3$.

With the pulley 21 rotating in the direction $a'$ against the face of the pulley 22 the tendency of the pulley 21 will be to ride up on the face of the pulley 22 in the direction indicated by the broken line $a^4$, for the pulley 21 is free to oscillate when moving in that direction on the pivot 5, one of the pivots of the hinge of the motor-base. This riding up of the pulley 21 on the pulley 22 as they rotate together is therefore in the arc of a circle the center of which is the axis of the pivot 5. In other words, the rolling together of the pulley 21 in the direction $a'$ and the pulley 22 in the direction $a^2$ tends to straighten out the angle $a^5$ and bring the centers of the pivot 5, the pulley 21, and the pulley 22 nearer to a straight line, which of course tends to shorten the distance between the centers of the pulley 21 and the pulley 22, so that the pulley 21 wedges itself against the pulley 22 with a force proportional to the resistance offered to its rotation by the pulley 22. As the pulley 22 is held by swinging bearings the wedging against it of the pulley 21 in this manner is transmitted with equal force to the pulley 23. By means of this arrangement if there is but a light load on the pulley 23, as when a car is running light or down a grade, the pulley 23 will offer but little resistance to the rotation of the pulley 22, and this in turn will offer but little resistance to the rotation of the pulley 21. Thus all the pulleys will run easily and with but little frictional grip upon each other. However, if there is a large load on the pulley 23, as when a car is full or when running up a grade, much resistance to the rotation of the pulley 22 will be offered by the pulley 23, and the pulley 22 will in turn offer much resistance to the rotation of the pulley 21, and this resistance will so increase the traction between the faces of the pulleys 21 and 22 that the pulley 21, as above stated, will tend to ride up the face of the pulley 22 and shorten the distance between the centers of these pulleys, so as to increase the rotary frictional grip of the faces of the pulleys. In other words, the frictional grip between the pulley 21 and the pulley 22 is proportional to the resistance offered by the pulley 22 to the rotation of the pulley 21, for as the resistance to rotation increases the tendency of the pulley 21 to swing on a hinge-pivot and ride up the surface of the pulley 22 and shorten the distance between their centers increases.

When the armature of the motor is rotated in the reverse direction, as indicated by the arrow $b$, the pulley 21 will tend to ride down the face of the pulley 22, swinging on the pivot 7 in the arc (indicated by the broken line $b'$) in such manner as to straighten the angle $b^2$ and tend to bring the centers of the pulleys nearer together, and thus increase the frictional contact between the pulleys.

With this arrangement of power-transmitting mechanisms applied to a car the motors can be run continuously, if desired, and by movement of the wedges or of corresponding parts the friction-pulleys can be thrown in or out of contact, as desired. The pulleys 21 on the same armature-shaft can be of the same diameter or of different diameters, and if they are of different diameters a ready means of getting different speeds is provided. These pulleys will run noiselessly and will have sufficient frictional grip to properly transmit the power from the driving-shaft to the driven shaft, which frictional grip will be directly proportional to the load to be moved—that is, when the load is light the friction between the pulleys and on the bearings will be light, and when the load is heavy the friction between the pulleys and on the bearings will be increased. The changing of the frictional grip of the pulleys is automatic and will occur in such manner that the frictional grip of the pulleys will quickly adjust itself to the load to be carried.

I claim as my invention—

1. A power-transmitting mechanism consisting of oscillating bearings and relatively stationary bearings, a driving-pulley and a driven pulley held by the bearings with their peripheries in contact, and yielding means normally forcing the oscillating bearings toward the stationary bearings and pressing the peripheries of the pulleys into contact, the bearings holding the axis of one pulley out of the same plane with the axis of the other pulley and the axis of oscillation of the oscillating bearings whereby the distance between the axes of the pulleys automatically changes as the resistance to the rotation of the driven pulley varies, substantially as specified.

2. A power-transmitting mechanism consisting of oscillating bearings, movable bearings and relatively stationary bearings and a driving-pulley, a driven pulley and an intermediate pulley with its periphery in contact with the peripheries of the driving and driven pulleys, the bearings holding the pulleys with their axes in the same plane with each other and the axis of oscillation of the oscillating bearing being out of the plane passing through the axes of the pulleys whereby the frictional grip between the peripheries of the pulleys automatically varies in force as the resistance to the rotation of the driven pulley changes, substantially as specified.

3. A power-transmitting mechanism consisting of oscillating bearings, a driving-pulley held by the oscillating bearings, relatively stationary bearings, a driven pulley held by the stationary bearings, movable bearings, an intermediate pulley held by the movable bearings, and yielding means normally pressing the peripheries of the pulleys into contact, the bearings holding the axis of the driven pulley and the axis of the intermediate pulley out of the same plane with the axis of the driving-pulley and the axis of oscillation of the oscillating bearings whereby the frictional grip between the peripheries of the pulleys automatically varies in force as the resistance to the rotation of the driven pulley changes, substantially as specified.

4. A power-transmitting mechanism consisting of oscillating bearings supported so as to have two axes of oscillation, a driving-pulley held by the oscillating bearings, a driven pulley with its periphery in contact with the periphery of the driving-pulley, and bearings holding the driven pulley with its axis out of the planes passing through the axes of oscillation of the oscillating bearings and axis of the driving-pulley whereby the angles between the planes passing through the axis of the driving-pulley and the axis of the driven pulley and through the axis of the driving-pulley and the axes of oscillation of the oscillating bearings automatically changes as the resistance to the rotation of the driven pulley varies, substantially as specified.

5. A power-transmitting mechanism consisting of oscillating bearings, a driving-pulley held by the oscillating bearings, an intermediate pulley with its periphery in contact with the periphery of the driving-pulley, a driven pulley with its periphery in contact with the intermediate pulley, and bearings holding the driven pulley with its axis out of the same plane with the axis of the oscillating bearings and axis of the driving-pulley whereby the angle between the planes passing through the axis of the driving-pulley and the axis of the driven pulley and through the axis of the driving-pulley and the axis of the oscillating bearings automatically changes as the resistance to the rotation of the driven pulley varies, substantially as specified.

6. A power-transmitting mechanism consisting of a driving-pulley, bearings holding the driving-pulley, a doubly-hinged support connected with the bearings, a driven pulley and bearings holding the driven pulley with its axis out of the same plane with the axis of the driving-pulley and the axis of the hinges whereby the frictional grip between the peripheries of the driving and the driven pulleys varies in force as the resistance to the rotation of the driven pulley changes, substantially as specified.

7. A power-transmitting mechanism consisting of a driving-pulley, bearings holding the driving-pulley, a doubly-hinged support connected with the bearings, a driven pulley, relatively immovable bearings holding the driven pulley, an intermediate pulley with its periphery in contact with the peripheries of the driving and the driven pulleys, and movable bearings holding the intermediate pulley in such manner that the frictional grip upon the peripheries of the pulleys varies in force as the resistance to the rotation of the driven pulley changes, substantially as specified.

8. A power-transmitting mechanism consisting of a driving-pulley, bearings holding the driving-pulley, a doubly-hinged support connected with the bearings, a movable bed to which the hinged support is attached, an intermediate pulley, movable bearings holding the intermediate pulley, a driven pulley, and relatively immovable bearings holding the driven pulley, the periphery of the intermediate pulley being in contact with the peripheries of the driving and the driven pulleys in such manner that the frictional grip between the peripheries of the pulleys varies in force as the resistance to the rotation of the driven pulley changes, substantially as specified.

9. A power-transmitting mechanism consisting of a driving-pulley, bearings holding the driving-pulley, a base supporting the bearings, a plate hinged to the base, a bed hinged to the plate, springs located between the base and the plate and the plate and the bed in such manner as to tend to separate these parts, a driven pulley, and bearings holding the driven pulley with its axis out of a straight line with the axis of the driving-pulley and the axes of the hinges, substantially as specified.

10. A power-transmitting mechanism consisting of a driving-pulley, bearings holding the driving-pulley, a support for the bearings, a double hinge connected with the support, a movable bed connected with the hinge, means for moving the bed backward and forward, an intermediate pulley, oscillating bearings holding the intermediate pulley, a driven pulley, and bearings connected with a relatively immovable support holding the driven pulley, the periphery of the intermediate pulley being in contact with the peripheries of the driving and driven pulleys in such manner that the frictional grip between the peripheries of the pulleys varies in force as the resistance to the rotation of the driven pulley changes, substantially as specified.

GEORGE J. CAPEWELL.

Witnesses:
H. R. WILLIAMS,
E. J. HYDE.